US012579842B2

(12) United States Patent
Van Oldenborgh et al.

(10) Patent No.: US 12,579,842 B2
(45) Date of Patent: Mar. 17, 2026

(54) METHOD FOR ADAPTING THE QUALITY AND/OR FRAME RATE OF A LIVE VIDEO STREAM BASED UPON POSE

(71) Applicant: Kepler Vision Technologies B.V., Amsterdam (NL)

(72) Inventors: Marc Jean Baptist Van Oldenborgh, Amsterdam (NL); Cees Snoek, Amsterdam (NL); Henricus Meinardus Gerardus Stokman, Amsterdam (NL)

(73) Assignee: Kepler Vision Technologies B.V., Amsterdam (NL)

( * ) Notice: Subject to any disclaimer, the term of this patent is extended or adjusted under 35 U.S.C. 154(b) by 0 days.

(21) Appl. No.: 18/677,785

(22) Filed: May 29, 2024

(65) Prior Publication Data

US 2024/0312254 A1 Sep. 19, 2024

Related U.S. Application Data

(63) Continuation of application No. 17/190,270, filed on Mar. 2, 2021, now Pat. No. 12,039,802.

(30) Foreign Application Priority Data

May 8, 2020 (EP) ..................................... 20173781
May 11, 2020 (EP) ..................................... 20173994

(51) Int. Cl.
*G06V 40/20* (2022.01)
*G06F 18/21* (2023.01)
(Continued)

(52) U.S. Cl.
CPC ............ *G06V 40/20* (2022.01); *G06F 18/217* (2023.01); *G06N 20/00* (2019.01); *G06V 20/41* (2022.01);
(Continued)

(58) Field of Classification Search
CPC ........ G06V 40/20; G06V 20/41; G06V 20/52; G06V 20/44; G06F 18/217; G06N 20/00; H04N 23/611; H04N 23/667
See application file for complete search history.

(56) References Cited

U.S. PATENT DOCUMENTS 10,755,106 B1 8/2020 Bakry et al.
2017/0294091 A1 10/2017 Min et al.
(Continued)

FOREIGN PATENT DOCUMENTS

WO 2018140332 A1 8/2018

OTHER PUBLICATIONS

Christian Micheloni, Marco Lestuzzi, Gian Luca Foresti, Adaptive video communication for an intelligent distributed system: Tuning sensors parameters for surveillance purposes, Machine Vision and Applications, vol. 9, Issue 5, pp. 359-373, Oct. 2008.
(Continued)

*Primary Examiner* — Yogesh K Aggarwal
(74) *Attorney, Agent, or Firm* — AEON Law, PLLC; Adam L.K. Philipp; Charlotte E. Holoubek

(57) ABSTRACT

The invention provides a system configured to adjust a data rate of an image capturing device. The system comprises a computing device comprising a data processor, and a computer program product comprising a computer vision system for categorizing living beings having a pose that appear in a live video stream. The computer program product, when running on the data processor, receives a live video stream from the image capturing device at a first data rate, where the live video stream comprises a time slice with at least one frame comprising a living being having a pose; applies the computer vision system to the time slice for categorizing the living being, resulting in a category; and signals the image capturing device to set the live video stream at a second data (Continued)

rate, different from the first data rate and based upon the category.

20 Claims, 4 Drawing Sheets

(51) Int. Cl.
| | | |
|---|---|---|
| *G06N 20/00* | (2019.01) | |
| *G06V 20/40* | (2022.01) | |
| *G06V 20/52* | (2022.01) | |
| *H04N 23/611* | (2023.01) | |
| *H04N 23/667* | (2023.01) | |

(52) U.S. Cl.
CPC ........... *G06V 20/52* (2022.01); *H04N 23/611* (2023.01); *H04N 23/667* (2023.01); *G06V 20/44* (2022.01)

(56) References Cited

U.S. PATENT DOCUMENTS

| | | | |
|---|---|---|---|
| 2021/0124412 A1* | 4/2021 | Johnson | ................ G06F 3/0346 |
| 2021/0185266 A1* | 6/2021 | Chan | ...................... H04N 25/77 |
| 2021/0201639 A1 | 7/2021 | Pettersson | |

OTHER PUBLICATIONS

European Search Report issued for EP Applicatio No. 20173781.

* cited by examiner 101 (FIG 1)

computing device comprising a data processor    401 computer program product comprising:

computer vision system for categorizing living beings having a pose that appear in a live video stream    403

402

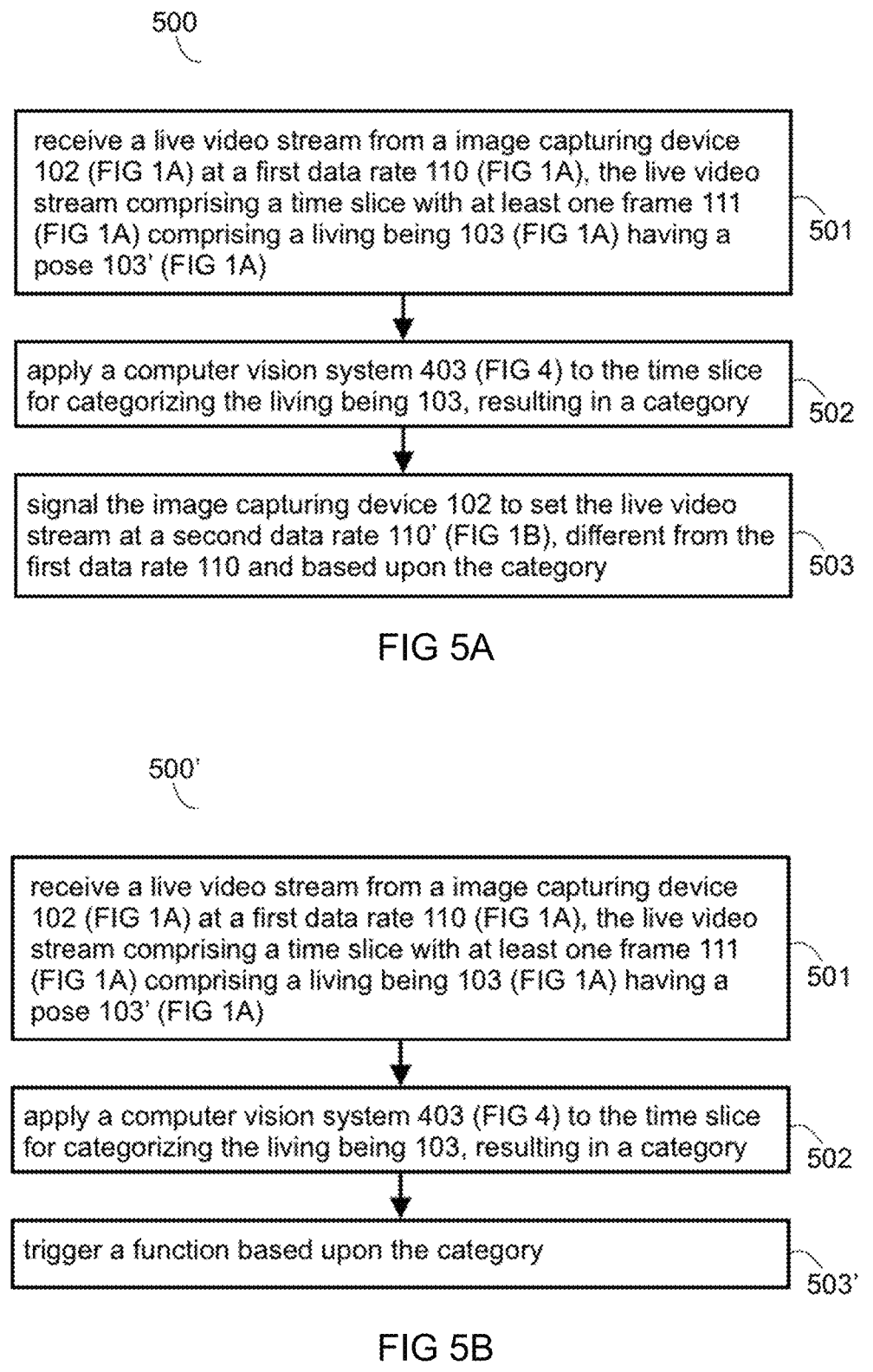

500

| receive a live video stream from a image capturing device 102 (FIG 1A) at a first data rate 110 (FIG 1A), the live video stream comprising a time slice with at least one frame 111 (FIG 1A) comprising a living being 103 (FIG 1A) having a pose 103' (FIG 1A) | 501 |

↓

| apply a computer vision system 403 (FIG 4) to the time slice for categorizing the living being 103, resulting in a category | 502 |

↓

| signal the image capturing device 102 to set the live video stream at a second data rate 110' (FIG 1B), different from the first data rate 110 and based upon the category | 503 |

| receive a live video stream from a image capturing device 102 (FIG 1A) at a first data rate 110 (FIG 1A), the live video stream comprising a time slice with at least one frame 111 (FIG 1A) comprising a living being 103 (FIG 1A) having a pose 103' (FIG 1A) | 501 |

↓

| apply a computer vision system 403 (FIG 4) to the time slice for categorizing the living being 103, resulting in a category | 502 |

↓

| trigger a function based upon the category | 503' |

FIG 5B

METHOD FOR ADAPTING THE QUALITY AND/OR FRAME RATE OF A LIVE VIDEO STREAM BASED UPON POSE

RELATED APPLICATIONS

This application continuation of U.S. patent application Ser. No. 17/190,270 filed Mar. 2, 2021, which claims priority to a European Patent Application No. EP20173781.4 filed May 8, 2020, and a European Patent Application No. EP20173994.3 filed May 11, 2020. The entire contents of the above-referenced applications and of all priority documents referenced in the Application Data Sheet filed herewith are hereby incorporated by reference for all purposes.

FIELD OF THE INVENTION

The invention relates to a system configured to adjust a data rate of an image capturing device, the image capturing device, a computer program product for controlling a live video stream, and a method for controlling an image capturing device.

BACKGROUND OF THE INVENTION

Artificial intelligence (AI) is developing rapidly and AI applications are supporting or will support all industries including the aerospace industry, agriculture, chemical industry, computer industry, construction industry, defense industry, education industry, energy industry, entertainment industry, financial services industry, food industry, health care industry, hospitality industry, information industry, manufacturing, mass media, mining, telecommunication industry, transport industry, water industry and direct selling industry.

The ability to monitor and/or to control systems is an area wherein AI can be very useful. Another area is the understanding of human behavior and interaction. In order to do that, AI systems should be able to detect and to recognize events in real-time. This requires smart approach using software, such as deep neural networks, and powerful computer hardware to execute computations within milliseconds.

Computer vision or machine vision is an area of AI wherein machine learning can be used to classify or to categorize scenes in images of living beings and objects. Computer vision is also a science that tries to understand what can be seen and what is happening in an image or series of images such as a photo picture, a video or a live stream. To that extend, machine learning can be used. An image contains a scene reflecting people, animals and/or objects showing a pose and often executing an activity.

Machine hearing is an area of AI wherein machine learning can be used to classify or to categorize sounds of living beings and objects. The technology allows a machine to selectively focus in a specific sound against many other competing sounds and background noise. This particular ability is called "auditory scene analysis". Moreover, the technology enables the machine to segment several streams occurring at the same time. Many commonly used devices such as a smartphones, smart speakers, voice translators, and vehicle voice command systems make use of machine hearing.

In "Discovery and recognition of motion primitives in human activities", 29 Sep. 2017, by Marta Sanzari et al. (https://arxiv.org/abs/1709.10494) according to its abstract describes "We present a novel framework for the automatic discovery and recognition of motion primitives in videos of human activities. Given the 3D pose of a human in a video, human motion primitives are discovered by optimizing the 'motion flux', a quantity which captures the motion variation of a group of skeletal joints. A normalization of the primitives is proposed in order to make them invariant with respect to a subject anatomical variations and data sampling rate. The discovered primitives are unknown and unlabeled and are unsupervisedly collected into classes via a hierarchical non-parametric Bayes mixture model. Once classes are determined and labeled they are further analyzed for establishing models for recognizing discovered primitives. Each primitive model is defined by a set of learned parameters.

Given new video data and given the estimated pose of the subject appearing on the video, the motion is segmented into primitives, which are recognized with a probability given according to the parameters of the learned models.

Using our framework we build a publicly available dataset of human motion primitives, using sequences taken from well-known motion capture datasets. We expect that our framework, by providing an objective way for discovering and categorizing human motion, will be a useful tool in numerous research fields including video analysis, human inspired motion generation, learning by demonstration, intuitive human-robot interaction, and human behavior analysis."

In "Random Temporal Skipping for Multirate Video Analysis", 30 Oct. 2018, by Yi Zhu et al. (https://arxiv.org/abs/1810.12522) according to its abstract describes "Current state-of-the-art approaches to video understanding adopt temporal jittering to simulate analyzing the video at varying frame rates. However, this does not work well for multirate videos, in which actions or subactions occur at different speeds. The frame sampling rate should vary in accordance with the different motion speeds. In this work, we propose a simple yet effective strategy, termed random temporal skipping, to address this situation. This strategy effectively handles multirate videos by randomizing the sampling rate during training. It is an exhaustive approach, which can potentially cover all motion speed variations. Furthermore, due to the large temporal skipping, our network can see video clips that originally cover over 100 frames. Such a time range is enough to analyze most actions/events. We also introduce an occlusion-aware optical flow learning method that generates improved motion maps for human action recognition. Our framework is end-to-end trainable, runs in real-time, and achieves state-of-the-art performance on six widely adopted video benchmarks."

WO2019190312A1 according to its abstract describes "The invention provides an artificial intelligence (AI) system for categorizing events, said AI system comprising a first state and a second state, wherein:

said AI system is in a first state for categorizing events in a first category type;

upon categorizing of a first event in a predefined category of said first category type, said AI system is set to said second state, in said second state said AI system is set for categorizing subsequent events in a second category type."

U.S. Pat. No. 10,555,393 according to its abstract describes "An apparatus includes a camera and a processor. The camera may be configured to capture video data. The processor may be configured to (A) process the video data, (B) generate control signals used to initiate a stimulus and (C) execute computer readable instructions. The computer readable instructions may be executed by the processor to perform video analysis on video frames of the captured video data to (a) detect a person, (b) detect context information associated with the detected person and (c) determine facial recognition results of the detected person. If the facial recognition results cannot detect a face of the detected person, the processor selects the stimulus from a plurality of stimuli. The stimulus may be selected in response to the context information to increase a probability of detecting a frontal view of the face of the detected person."

SUMMARY OF THE INVENTION

Artificial intelligence (AI) systems often require lots of GPU and/or CPU processor power. The power consumption of these processors is substantial and, in particular at full power, can cause overheating of the surrounding parts in a system. In addition, AI systems typically process a lot of data. When this data is being transferred over a network, sufficient bandwidth should support the data rate required for the application. This applies in particular for AI systems analyzing live video streams which use computer vision technology for monitoring or surveilling people and places. Cameras, or in general image capturing devices, are being installed everywhere in rapidly growing numbers. As a result, there is an increasing demand for automated monitoring of live video streams and computer vision systems which can send out a notification when an alarming incident happens. Reliability is often a crucial factor, in particular when a computer vision system is looking after the safety of people. The reliability of computer vision increases when more data, e.g. big data, is available for inferencing. Transferring and processing big data takes lots of resources including network bandwidth and computational power. Therefore, using computer vision for 24/7 monitoring a live video stream can either be expensive (e.g. due to cloud and network costs) or impossible (e.g. due to insufficient bandwidth), or both. To mitigate these deficiencies the data rate, and therefore the quality, of live video streams can be reduced. In practice, this turns out to be a good strategy since most of the time nothing alarming happens, and computer vision systems can still operate reliably at relatively low data rates comprising, for instance, an SD quality video stream consisting of a few frames per minute. But certain events and incidents, such as the appearance of people and animals, cannot be inferenced correctly or reliably by computer vision without high data rates comprising typically an HD quality video stream and several frames per second or more.

The current invention allows for instance a flexible use of network bandwidth and (computational) power consumption by adjusting the data rate of a camera. This will have many advantages such as, but not limited to: reduced power consumption, less data traffic and cost reduction.

To that end, there is provided a system configured to adjust a data rate of an image capturing device, said system comprising:

a computing device comprising a data processor, and a computer program product comprising a computer vision system for categorizing living beings having a pose that appear in a live video stream, wherein said computer program product when running on said data processor:

receives a live video stream from said image capturing device at a first data rate, said live video stream comprising a time slice with at least one frame comprising a living being having a pose;

applies said computer vision system to said time slice for categorizing said living being, resulting in a category;

signals said image capturing device to set said live video stream at a second data rate, different from said first data rate and based upon said category.

A time slice defines a part of a live video stream and has a begin- and end time. A time slice can comprise one or more (video) frames.

To signal an image capturing device can comprise a control signal, a text message, an electromagnetic signal, an optical signal, a machine detectable or processable signal.

In addition, the current invention can be built-in a camera and therefore reduces the heating of the camera and can therefore prevent overheating of the camera.

There is further provided an image capturing assembly comprising the provided system and an image capturing device. In an embodiment, the image capturing assembly comprises a housing holding the image capturing device. In an embodiment thereof, the housing further comprising at least part of the system. In a particular embodiment, the housing comprises the image capturing device and the system. A housing or casing holding all these functional parts provides a compact system that for instance requires low power consumption, allowing stand-alone functioning. It may include a power supply and for instance wireless communication.

An image capturing device in an embodiment is a device that can provide a digital output by an image or a series of images or a time series of images, in particular a digital image or digital picture. Such a device can comprise a camera of a filming (motion picture) device. Examples are devices comprising a CCD or similar imaging elements. Other examples are devices comprising a microphone for digitalizing sound into a sound image. Further examples of image capturing devices are a camera, a sonar, a RADAR, a laser, LIDAR and an infrared camera. As such, these devices are known to a skilled person. In order to support the invention, the data rate of an image capturing device can be adjusted by setting various parameters of a live stream such as color range, quality, resolution, size, frame/sample rate and compression.

In an embodiment the adjusting of said data rate comprises setting at least one selected from video resolution, quality, frame rate, format, size, color range, depth range, compression and a combination thereof. In this respect, quality can relate to bits used in color.

In an embodiment, the categorizing said living being is based upon said pose.

In an embodiment, the time slice comprises a plurality of frames and said categorizing said living being is based upon a change of pose.

In an embodiment, after signaling said image capturing device, said system starts applying said computer vision system for monitoring said living being.

In an embodiment, after signaling said image capturing device, said system stops applying said computer vision system for monitoring said living being.

In an embodiment complying to privacy regulations and requirements is provided. Monitoring or observing in detail is allowed when there is a need or benefit for a person that is being monitored, e.g. a patient. During normal operations and analyzing a live video stream at a low data rate, no further data is processed or stored. Triggered by an event or a change of pose said live video stream is set to a high data rate (e.g. increasing the sample rate of the video) for categorizing events in case of emergencies, for instance. Automatic monitoring can be activated, and collection and storage of evidence.

In an embodiment, the first data rate and second data rate differ at least 10%. In a further embodiment, the first data rate and second data rate differ at least 50%.

There is further provided a method for controlling an image capturing device, in particular controlling a data rate of an image capturing device, said method comprising:

receiving a live video stream from said image capturing device at a first data rate, said live video stream comprising a time slice with at least one frame comprising a living being having a pose;

providing said time slice to a computer vision system for categorizing living beings that appear in said live video stream, resulting in a category;

based upon said category controls said image capturing device to set said live video stream from said first data rate to a second data rate, different from said first data rate.

There is further provided a computer program product for controlling a live video stream, said computer program product when executed on a data processing device sets said data processing device to:

receive a live video stream at a first data rate, said live video stream comprising a time slice with at least one frame comprising a living being having a pose;

provide said time slice to a computer vision system for categorizing said living being, resulting in a category;

receive said category, and based upon said category, control an image capturing device to set its live video stream data rate at a second data rate, different from said first data rate.

There is further provided a use of a system according to any one of the preceding claims for assisting in one selected from elderly care and home care.

There is furthermore provided a method for controlling a live video stream, said method comprising:

receiving said live video stream at a first data rate, said live video stream comprising a time slice with at least one frame comprising a living being having a pose;

providing said time slice to a computer vision system for categorizing living beings having a pose that appear in said live video stream, resulting in a category;

based upon said category issue a control command to set said live video stream from a first data rate to a second data rate, different from said first data rate.

A computer vision system uses computer vision to 'look' into a live video stream and uses artificial intelligence and machine learning to understand its content. When a living being appears in a live video stream, computer vision is used to categorize the type of the living being, the pose of the living being, the action of the living being, the environment of the living being, and a combination thereof. Similar, when an action or event occurs in a live video stream, computer vision is used to categorize the type of action or event, the environment of the action or event, and a combination thereof.

In order to detect and localize a subject in a scene from a captured image in a live video stream, in an embodiment use is made of a method to detect subjects. Such a method will use machine learning techniques (mainly deep learning) to design and train a model which detects subjects given an input of a visual representation, e.g. an RGB image, as the system perceives. The model is trained on a large amount of annotated data; it comprises images with and without subjects and locations of the subjects are annotated.

In the case of deep learning, a detection framework such as Faster-RCNN, SSD, R-FCN, Mask-RCNN, or one of their derivatives can be used. A base model structure can be VGG, AlexNet, ResNet, GoogLeNet, adapted from the previous, or a new one. A model can be initialized with weights and trained similar tasks to improve and speedup the training. Optimizing the weights of a model, in case of deep learning, can be done with the help of deep learning frameworks such as Tensorflow, Caffe, or MXNET. To train a model, optimization methods such as Adam or RMSProb can be used. Classification loss functions such Hinge Loss or Softmax Loss can be used. Other approaches which utilize handcrafted features (such as LBP, SIFT, or HOG) and conventional classification methods (such as SVM or Random Forest) can be used.

In order to detect and localize a living being in a scene from a retrieved image in a live video stream, an embodiment uses a method to detect living beings. Such a method will use machine learning techniques (mainly deep learning) to design and train a model which detects living beings given an input of a visual representation, e.g. an RGB image, as the system perceives. The model is trained on a large amount of annotated data; it comprises images with and without living beings and locations of the living beings are annotated.

To detect bodily features (e.g. to detect pose), the system in an embodiment can determine key points on the body (e.g. hands, legs, shoulders, knees, etc.) of a living being.

To detect the key points on the body of a living being, in an embodiment the system comprises a model that is designed and trained for this detection. The training data to train the model comprises an annotation of various key points locations. When a new image is presented, the model allows identification of the locations of such key points. To this end, the system can utilize existing key point detection approaches such as MaskRCNN or CMU Part Affinity Fields.

The training procedure and data can be customized to best match the context of the content of the retrieved images. Such context may comprise an indoor context (e.g. a living room, bathroom, bedroom, kitchen, or a room within a care center, a hospital, a shop, a restaurant an office, a station, an airport, a theatre, a cinema, or in a train, a bus, airplane etc.) or an outdoor context (like a beach, a field, a street, a square, a park etc.) wherein there are changing lighting conditions.

For example, a pretrained deep neural network (DNN) on ImageNet, e.g. VGGNet, AlexNet, ResNet, Inception and Xception, can be adapted by taking the convolution layers from these pretrained DNN networks, and on top of them adding new layers specially designed for scene recognition comprising one or more display devices (e.g. pictures of living being and windows to an outdoor scene that should be excluded from scene recognition), and train the network as described for the model. Additional new layers could comprise specially designed layers for scene recognition, pose and action recognition. All the aforementioned layers (for scene recognition, pose recognition, action recognition, event recognition, body language recognition, and a combination thereof) can be trained independently (along with/ without the pre-trained conventional layers) or trained jointly in a multi-task fashion.

In an embodiment thereof or of the previous method, multiple images from a live video stream providing a time series are input in said machine learning model, and wherein said outputs of said machine learning model are concatenated as input for a further deep neural network predict probabilities of each pose of a person to operate at least one actuator, present in the multiple images.

In this way, poses of one or more persons to operate at least one actuator can be determined even better using time laps.

The multiple images can be processed sequentially. In an embodiment, the multiple images are processed parallel or semi-parallel. This allows near-real time of even real time processing.

Categorization may involve identifying to which of a set of categories (e.g. normal pose or awkward pose and/or allowed action or prohibited action and/or normal condition scene or emergency scene and/or ordinary object or out-of-the-ordinary object) a new captured scene may belong, on the basis of a set of training data with known categories, such as the aforementioned categories. Categorization of the one or more subsets of data points associated with a captured scene may be performed using one or more machine learning algorithms and statistical classification algorithms. Example algorithms may include linear classifiers (e.g. Fisher's linear discriminant, logistic regression, naive Bayes, and perceptron), support vector machines (e.g. least squares support vector machines), clustering algorithms (e.g. k-means clustering), quadratic classifiers, multi-class classifiers, kernel estimation (e.g. k-nearest neighbor), boosting, decision trees (e.g. random forests), neural networks, Gene Expression Programming, Bayesian networks, hidden Markov models, binary classifiers, and learning vector quantization. Other example classification algorithms are also possible.

The process of categorization may involve the computing device determining, based on the output of the comparison of the one or more subsets with the one or more predetermined sets of scene types, a probability distribution (e.g. a Gaussian distribution) of possible scene types associated with the one or more subsets. Those skilled in the art will be aware that such a probability distribution may take the form of a discrete probability distribution, continuous probability distribution, and/or mixed continuous-discrete distributions. Other types of probability distributions are possible as well.

Categorizing an event is the process of matching up an event to at least one category. In particular categorizing an event is detecting the event and assigning it to one or multiple categories and possibly assigning a confidence level and/or probability for each category.

A category type is a catalog of one or more categories of events that can be associated to one or more conditions, or to a description. If associated, the one or more conditions or description determine whether or not a category of events belongs to the category type.

As mentioned above, artificial intelligence (AI) and in particularly computer vision is developing rapidly and an embodiment of a system according the invention can be integrated or used in applications that are supporting or will support all industries including the aerospace industry, agriculture, chemical industry, computer industry, construction industry, defense industry, education industry, energy industry, entertainment industry, financial services industry, food industry, health care industry, hospitality industry, information industry, manufacturing, mass media, mining, telecommunication industry, transport industry, water industry and direct selling industry.

An embodiment of a system according the invention can be applied to and integrated in many different larger systems. An embodiment of a system according the invention can be physically integrated in such a larger system, or it can be functionally coupled to such a larger system. For instance, an embodiment of a system according the invention can be part of a vehicle, a plane, a boat, part of an energy plant, part of a production facility, part of a payment system, a drone or a robotic system.

The ability to monitor and control systems is an area wherein computer vision can be very useful. Another area is the understanding of human behavior and interaction. Therefore, computer vision systems in an embodiment are used to detect and to recognize events in real-time. This requires a smart approach using software, such as deep neural networks, and powerful computer hardware to execute computations within milliseconds. In the current computer vision system, a trained neural network can be used.

In an embodiment when the AI system of a computer vision system is in a mode where it trains itself to a new particular task, while it is under the constraint that the training data should be anonymous, the system may detect that it can infer with certain probability the origin of the data. In this case, the system may switch itself to a mode where it "unlearns" its most recently gained knowledge.

There is further provided system configured to adjust a data rate of an image capturing device, said system comprising:
- a computing device comprising a data processor, and
- a computer program product comprising a computer vision system for categorizing events that appear in a live video stream,
- wherein said computer program product when running on said data processor:
- receives a live video stream from said image capturing device at a first data rate, said live video stream comprising a time slice with at least one frame comprising an event;
- applies said computer vision system to said time slice for categorizing said event, resulting in a category;
- signals said image capturing device to set said live video stream at a second data rate, different from said first data rate and based upon said category.

Categorizing said event is based upon an action of a living being that appears in said time slice.

There is further provided a method for controlling a live video stream, said method comprising:
- receiving said live video stream at a first data rate, said live video stream comprising a time slice with at least one frame comprising an event;
- providing said time slice to a computer vision system for categorizing said event that appears in said live video stream;
- applies said time slice to said computer vision system for categorizing said event, resulting in a category;
- based upon said category issue a control command to set said live video stream from said first data rate to a second data rate, different from said first data rate.

This allows a live video stream to have a data rate that can vary based upon what is present in said live video stream.

There is further provided a use of a system as described for assisting in one selected from elderly care and home care.

The term "substantially", if used, will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 5A-B depict flow charts of example methods.

The drawings are not necessarily on scale.

DESCRIPTION OF PREFERRED EMBODIMENTS

Figure 1A:
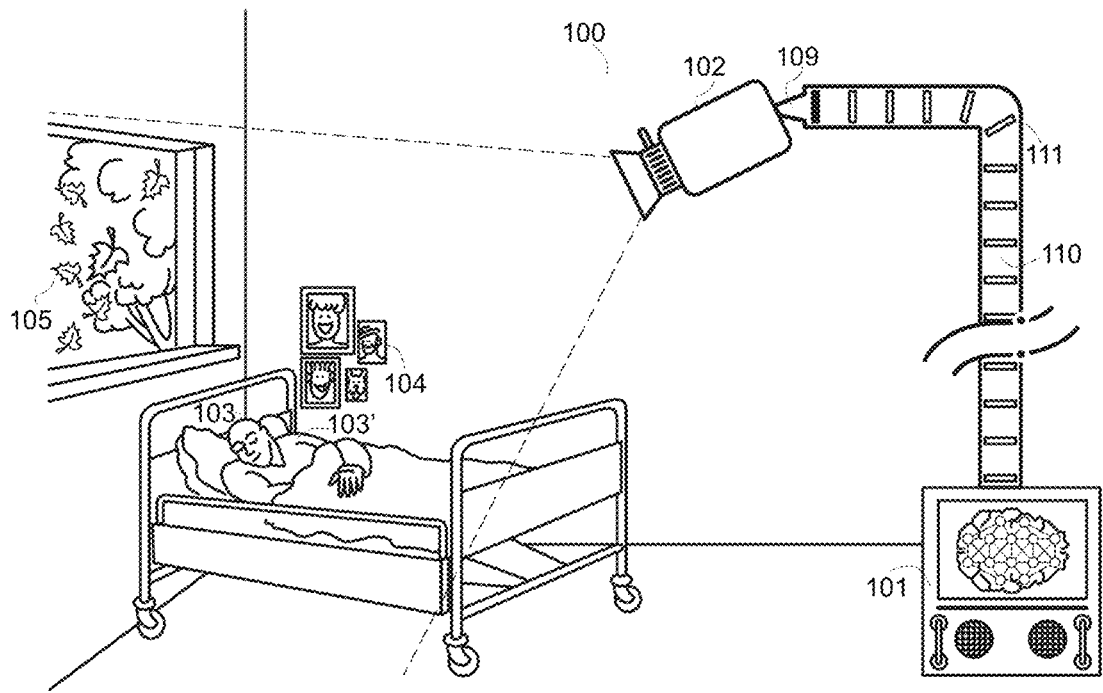
FIGS. 1A-1B depict an embodiment of a system changing the data rate of a camera when a person wants to go out of bed.
Figure 1B:
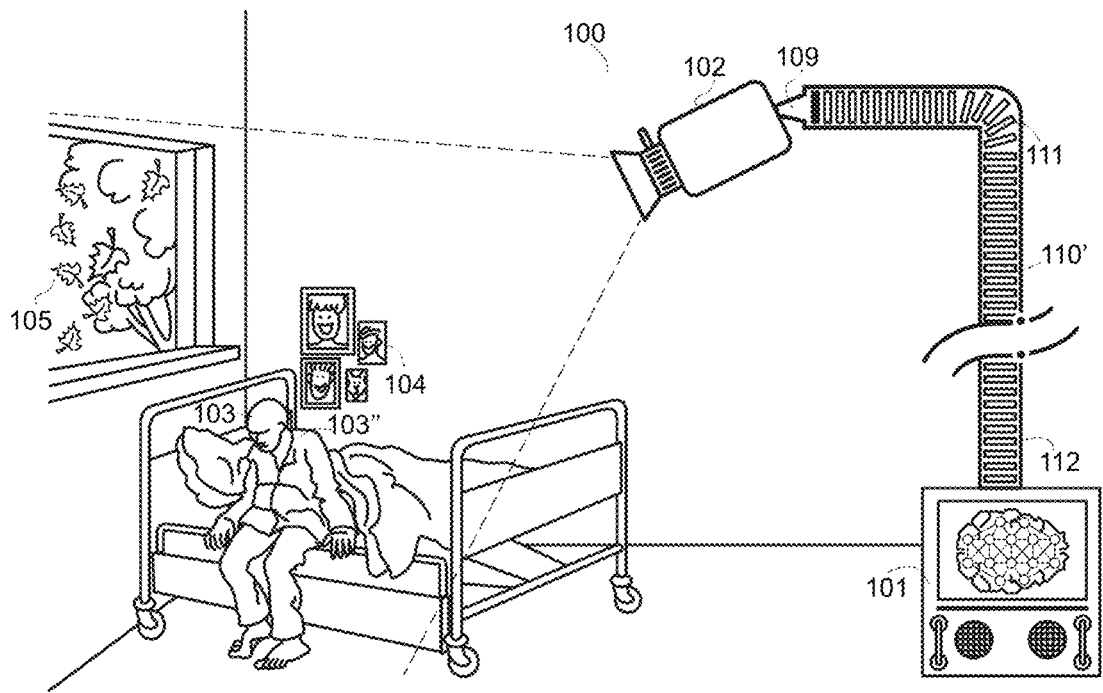

FIGS. 1A-B depict an example of adjusting a frame rate 110 to a frame rate 110' of a camera 102 by an embodiment of system 101, during monitoring a person 103 with a pose 103', in a room 100 with pictures 104 on the wall and a window showing waving tree branches 105 in stormy weather outside, wherein the camera 102 and the system 101 are connected by a data connection 109 that can either be a wired or wireless connection.

FIG. 1A depicts an example of a room 100 (e.g. a hospital or care center) wherein a person 103 is sleeping, having a pose 103', and the camera 102 outputs a live video stream of person 103, consisting of frames 111, at a low frame rate 110 to an embodiment of a system 101, the system 101 monitors person 103 and categorizes, with component 403 (FIG. 4), person 103 in a category "sleeping person in bed".

FIG. 1B depicts an example of a room 100 wherein a person 103 is sitting on the edge of the bed, having a pose 103", and the system 101 monitoring person 103 categorizes, with component 403, person 103 in a category "sitting person on the edge of the bed", and the system 101 signals, by signal 112, the camera 102 to set the live video stream at a high frame rate 110'.

An embodiment of system 101 comprises 2 data connections to a camera 102 wherein the system 101 receives a live video stream over a first data connection and the system 101 signals a signal 112 over a second data connection.

In further embodiments the first data connection and the second data connection are selected from a wired connection, a wireless connection, and a combination thereof.

A further embodiment of system 101 comprises a computer vision system 403 which applies a machine learning model that is trained to categorize a person and a pose of a person without being misled by the pictures 104 on the wall which might show a person in a conflicting pose to the pose 103' and pose 103" of person 103.

A further embodiment of system 101 comprises a computer vision system 403 which applies a machine learning model that is trained to categorize an action of a person without being misled by the waving tree branches 105 outside in front of the window.

In addition, an embodiment of system 101 notifies a caregiver when categorizing by component 403 (FIG. 4) of the embodiment system 101 results in a category indicating that person 103 is in the need for help. Thus, the category may be "person in need for help", or "person in distress". In case of such an event, the system 101 can notify the caregiver. This may for instance comprise giving a sound signal or a light signal. In a more advance embodiment, the system may comprise a wireless or wired data communication device. The system 101 for instance transmits an alarm, message, or sound to a device like a mobile telephone or smartphone or cell phone carried by the caregiver. The system 101 may also issue such an action to an alarm center. The system 101 may even trigger more complex events or actions. For instance, the time slice or part of that may be provided to a further data analysis system, like a further AI system, for performing a more in-depth analysis. This may trigger law enforcement systems, medical staff, or the like.

Figure 2:
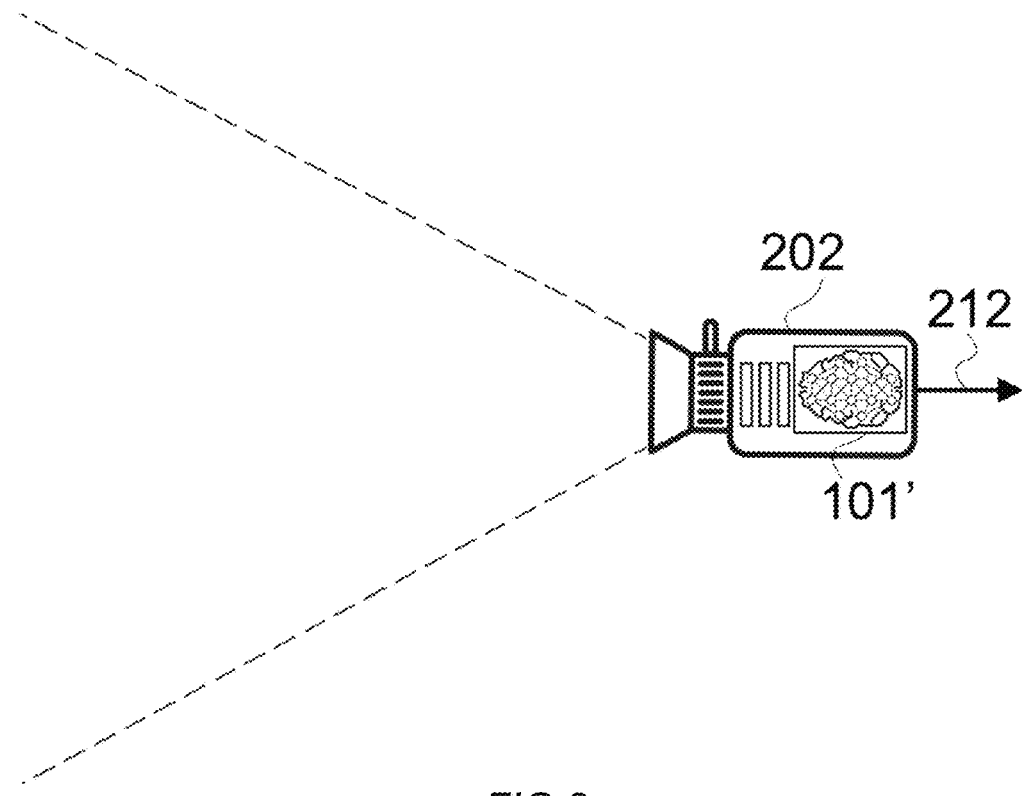
FIG. 2 depicts an embodiment of a camera comprising a system for adjusting the data rate of the camera.

FIG. 2 depicts an embodiment of a camera 202 comprising an embodiment of system 101'. Camera 202 is configured to adjust the data rate of its own live stream to the system 101'.

In an embodiment, the system 101' triggers upon categorizing an event, with component 403 (FIG. 4), a function 212 that comprises outputting a notification.

Such a notification can for instance inform individuals, institutes and companies that want to be notified when a predefined event occurs.

In an embodiment, triggering a function results in at least one of a notification, a control signal, a text message, an electromagnetic signal, an optical signal, a signal perceptible by senses of a living being or of a human being, a machine detectable or processable signal.

In a situation wherein a patient is being looked after, the notification can comprise a message that help is needed.

Figure 3A:
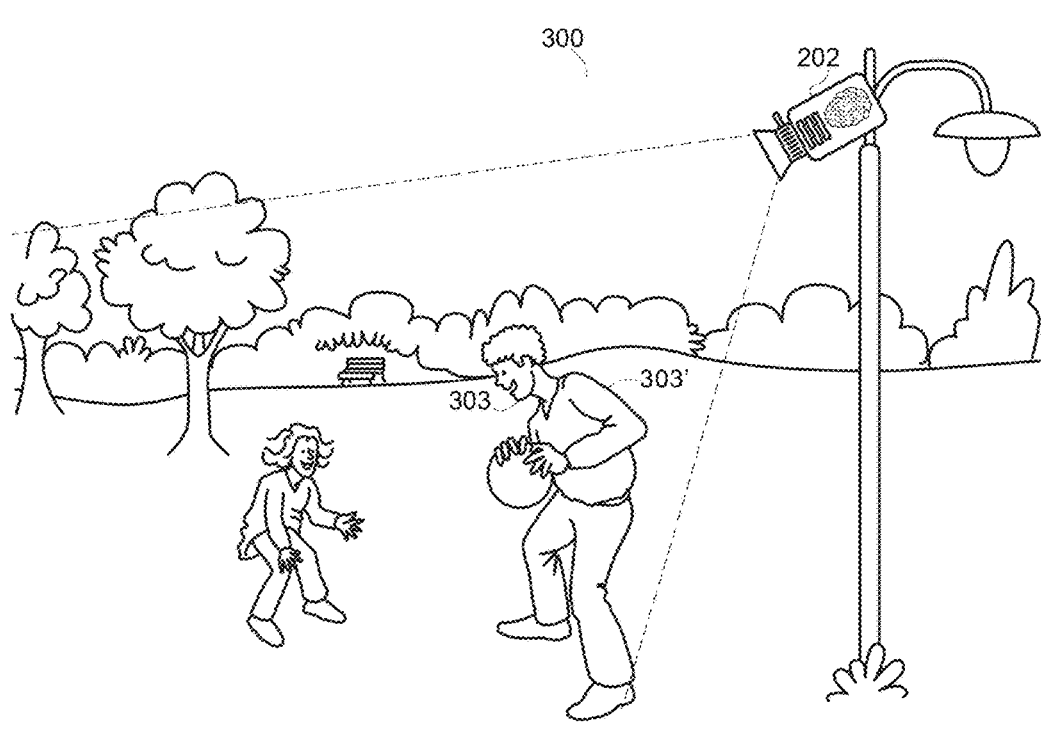
FIGS. 3A-3B depict an embodiment of a camera for surveillance of park.
Figure 3B:
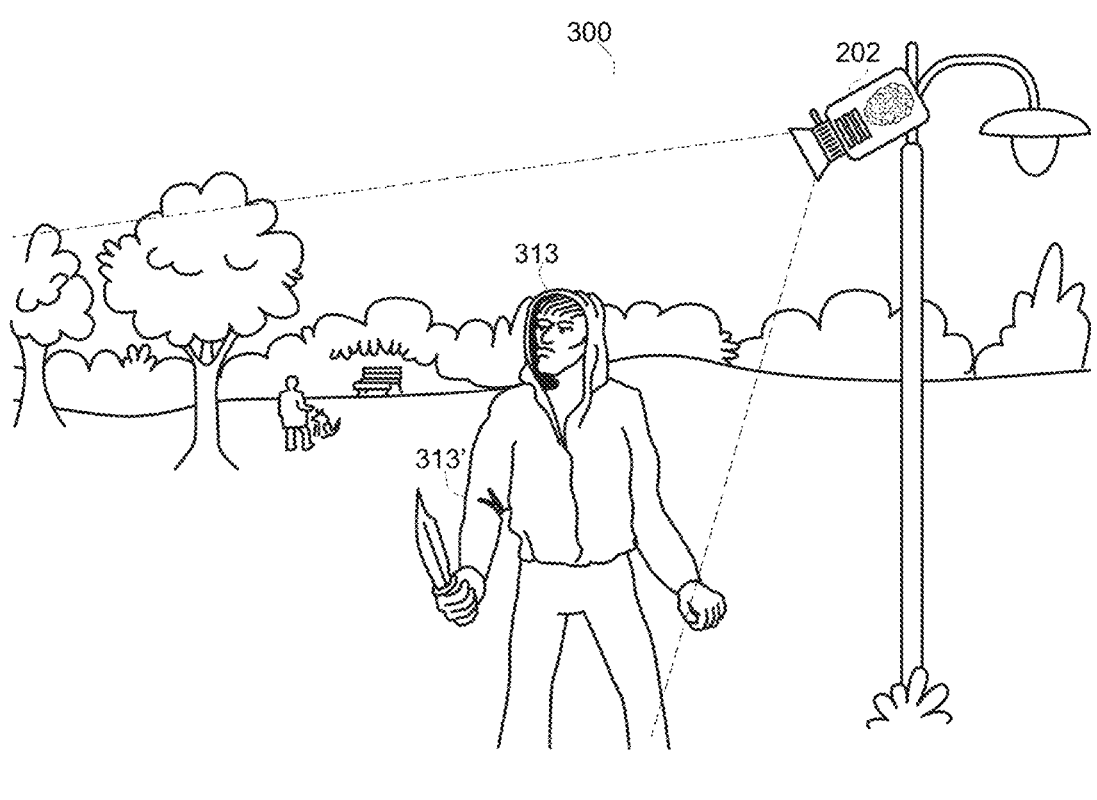

FIGS. 3A-B depict an example of the adjustment of a frame rate of a camera 202 by an embodiment of system 101' (FIG. 2), when surveilling a park 300.

FIG. 3A depicts an example of a park 300 wherein the camera 202 is surveilling a person 303 having a pose 303', in a live video stream at a low data rate. The live video stream can stay at a low data rate since pose 303' is reflecting non disturbing body language which is harmless.

FIG. 3B depicts an example of a park 300 wherein a live video stream of camera 202 has been set to a high data rate at the appearance of a person 313 having a pose 313'. The live video stream has been set to a high data rate since pose 313' is reflecting disturbing body language which could lead to harmful consequences and therefore should be monitored closely with more computational power.

In other examples any public or private area can be surveilled by camera 202.

In an embodiment camera 202 alarms law enforcement when categorizing by component 403 (FIG. 4) of an embodiment of system 101' results in a disturbing category indicating a crime is (likely) going to happen.

Figure 4:
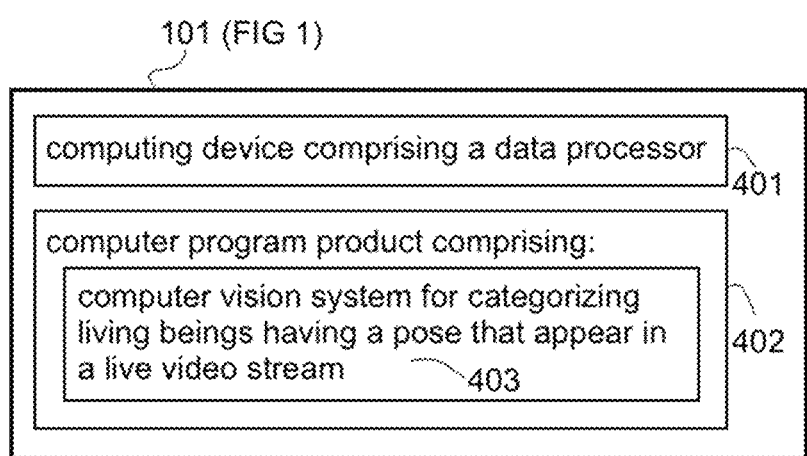
FIG. 4 depicts a simplified block diagram of a system configured to adjust a data rate of an image capturing device.

FIG. 4 depicts a simplified block diagram of a system 101 (FIG. 1A-1B) configured to adjust a data rate of an image capturing device 102 (FIG. 1A-1B, in accordance with an example embodiment. Components coupled to or included in the system may include a component 401, i.e. a computing device comprising a data processor, and may include a component 402, i.e. a computer program product comprising a component 403, i.e. a computer vision system for categorizing living beings having a pose that appear in a live video stream.

In other embodiments, a computer program product 402 may include more, or different systems, and each system may include more, fewer, or different components. Additionally, the systems and components shown may be combined or divided in any number of ways.

In an embodiment a component 402 takes as input a live video stream comprising a time slice with at least one frame, the frame comprising a plurality of data points and applies a component 403 to a subset of a plurality of data points that corresponds to at least one person (e.g. 103, 303 or 313) with a pose (e.g. 103', 303' or 313')

In a further embodiment a component 402 receives an input comprising a live video stream that comprises a time slice with at least one frame, the frame comprising a plurality of data points and applies a component 403 to multiple subsets of the plurality of data points that corresponds to at least one person (e.g. 103, 303 or 313) with a pose (e.g. 103', 303' or 313')

The living being may be or comprise an animal. In an embodiment related to animals, component 403 is applied for categorizing the animal, resulting in a category.

In an alternative embodiment, component 403 is applied for categorizing events. These events may be selected from the movement of a door, the movement of a window, the movement of a vehicle, the movement of a bridge, the movement of a gate, switching on and/or off of a light, the outbreak of a fire, sunrise, sunset, various types of weather conditions and changes (e.g. stormy, rainy and sunny), flooding, lightning and a combination thereof.

FIG. 5A-5B depict 2 flow charts of an example method 500 to adjust a data rate of an image capturing device such as device 102 (FIG. 1A-1B) or device 202 (FIG. 2) and an example method 500' to trigger a function 212 (FIG. 2).

The methods 500 and 500' may include one or more operations, functions, or actions as illustrated by one or more of blocks 501-503/503'. Although the blocks are illustrated in a sequential order, these blocks may in some instances be performed in parallel. Also, the various blocks may be combined into fewer blocks, divided into additional blocks, and/or removed based upon the desired implementation.

In addition, for the methods 500 and 500', and other processes and methods disclosed herein, the flow charts shows functionality and operation of one possible implementation of present embodiments. In this regard, each block may represent a module, a segment, or a portion of program code, which includes one or more instructions executable by data a processor (in 401, FIG. 4) for implementing specific logical functions or steps in the process. The computer program product 402 (FIG. 4) may be stored on any type of computer readable medium or memory, for example, such as a storage device including a disk or hard drive.

In addition, for the methods 500 and 500', and other processes and methods disclosed herein, each block in FIGS. 5A-5B may represent circuitry that is wired to perform the specific logical functions in the process. For the sake of example, the methods 500 and 500' shown in FIG. 5A-5B will be described as implemented by an example computer program product such as the computer program product 402 (FIG. 4). The methods 500 and 500' can also be described as implemented by a camera or computing device, as the computing device and the computer program product may be onboard the camera, as illustrated by camera 202 (FIG. 2, FIG. 3A-3B), or may be off-board but in wired or wireless communication with the camera, as illustrated by camera 102 (FIG. 1A-1B). Therefore, the terms "computer device", "computer program product" and "camera" can be interchangeable herein. It should be understood that other entities or combinations of entities can implement one or more steps of the example methods 500 and 500'.

At block 501, the methods 500 and 500' include: receive a live video stream from an image capturing device 102 (FIG. 1A) at a first data rate 110 (FIG. 1A), the live video stream comprising a time slice with at least one frame 111 (FIG. 1A) comprising a living being 103 (FIG. 1A) having a pose 103' (FIG. 1A)

At block 502, the methods 500 and 500' includes: apply a computer vision system 403 (FIG. 4) to the time slice for categorizing the living being 103, resulting in a category.

At block 503, the method 500 includes: signal the image capturing device 102 to set the live video stream at a second data rate 110' (FIG. 1B), different from the first data rate 110 and based upon the category.

At block 503', the method 500' includes: trigger a function based upon the category. In an embodiment that function comprises outputting a notification.

A notification can be a message; e.g. an email message, text/SMS message, or a digital message preferably encrypted.

The function can be implemented and/or executed at or on the same system or at or on an external system. In particular, the function can be triggered by an API call and/or JSON command.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:

1. A system configured to adjust a data rate of an image capturing device, said system comprising:
    a computing device comprising a data processor, and
    a computer program product comprising a machine learning model trained for categorizing living beings having a change of pose that appear in a live video stream,
wherein said computer program product when running on said data processor:
    receives a live video stream from said image capturing device at a first data rate, said live video stream comprising a time slice with a plurality of frames comprising a living being having a change of pose;
    applies said machine learning model to said time slice, said machine learning model categorizing said living being based upon said change of pose, resulting in a category; and
    sets said live video stream at a second data rate, different from said first data rate and based upon said category, resulting in a continued live video stream.

2. The system according to claim 1, wherein said categorizing said living being is based upon said pose.

3. The system according to claim 1, wherein said time slice comprises a plurality of frames and said categorizing said living being is based upon a change of pose.

4. The system according to claim 1, wherein after signaling said image capturing device, said system starts applying said computer vision system for monitoring said living being.

5. The system according to claim 1, wherein after signaling said image capturing device, said system stops applying said computer vision system for monitoring said living being.

6. The system according to claim 1, wherein the adjusting of said data rate comprises setting at least one selected from video resolution, quality, frame rate, format, size, color range, depth range, compression and a combination thereof.

7. The system according to claim 1, wherein said first data rate and second data rate differ at least 50%.

8. An image capturing assembly comprising the system according to claim 1 and an image capturing device.

9. A method for controlling an image capturing device, said method comprising:
    receiving a live video stream from said image capturing device at a first data rate, said live video stream comprising a time slice with a plurality of frames comprising a living being having a change of pose;
    providing said time slice to a machine learning model trained for categorizing living beings that appear in said live video stream based upon said change of pose, resulting in a category; and
    based upon said category controls said image capturing device to set said live video stream from said first data rate to a second data rate, different from said first data rate, resulting in a continued live video stream.

10. One or more non-transitory computer-readable media comprising instructions that cause a data processing device, in response to execution of the instructions by a processor of the data processing device, to cause the data processing device to control a live video stream, said computer program when executed on said data processing device configuring said data processing device to:
    receive a live video stream at a first data rate, said live video stream comprising a time slice with a plurality of frames comprising a living being having a change of pose;
    provide said time slice to a a machine learning model trained for categorizing said living being based upon said change of pose, resulting in a category;
    receive said category, and
    based upon said category, control an image capturing device to set its live video stream data rate at a second data rate, different from said first data rate, resulting in a continued live video stream.

11. Use of a system according to claim 1 for assisting in one selected from elderly care and home care.

12. A method for controlling a live video stream, said method comprising:
    receiving said live video stream at a first data rate, said live video stream comprising a time slice with at least one frame comprising a living being having a change of pose;
    providing said time slice to a computer vision system comprising a machine learning model trained for categorizing living beings having a change of pose that appear in said live video stream, said categorizing based upon said change of pose and resulting in a category; and
    based upon said category issue a control command to set said live video stream from said first data rate to a second data rate, different from said first data rate, resulting in a continued live video stream.

13. The system according to claim 1, wherein said computer vision system comprises a further machine learning model trained for categorizing events that appear in said continued live video stream, wherein said computer program product when running on said data processor:

receives said continued live video stream from said image capturing device at the second data rate, and applies said further machine learning model to said continued live video stream for categorizing an event in said continued live video stream, resulting in an event category.

14. The system according to claim 13, wherein said machine learning model and said further machine learning model are integrated into a combined machine learning model.

15. The method according to claim 9, comprising a further machine learning model trained for categorizing events that appear in said continued live video stream, wherein said computer program product when running on said data processor:

receives said continued live video stream from said image capturing device at the second data rate, and applies said further machine learning model to said continued live video stream for categorizing an event in said continued live video stream, resulting in an event category.

16. The method according to claim 15, wherein said machine learning model and said further machine learning model are integrated into a combined machine learning model.

17. The one or more non-transitory computer-readable media according to claim 10, wherein said computer vision system comprises a further machine learning model trained for categorizing events that appear in said continued live video stream, wherein said computer program product when running on said data processor:

receives said continued live video stream from said image capturing device at the second data rate, and applies said further machine learning model to said continued live video stream for categorizing an event in said continued live video stream, resulting in an event category.

18. The one or more non-transitory computer-readable media according to claim 17, wherein said machine learning model and said further machine learning model are integrated into a combined machine learning model.

19. The method according to claim 12, comprising a further machine learning model trained for categorizing events that appear in said continued live video stream, wherein said computer program product when running on said data processor:

receives said continued live video stream from said image capturing device at the second data rate, and applies said further machine learning model to said continued live video stream for categorizing an event in said continued live video stream, resulting in an event category.

20. The method according to claim 19, wherein said machine learning model and said further machine learning model are integrated into a combined machine learning model.

* * * * *